Figure 1:
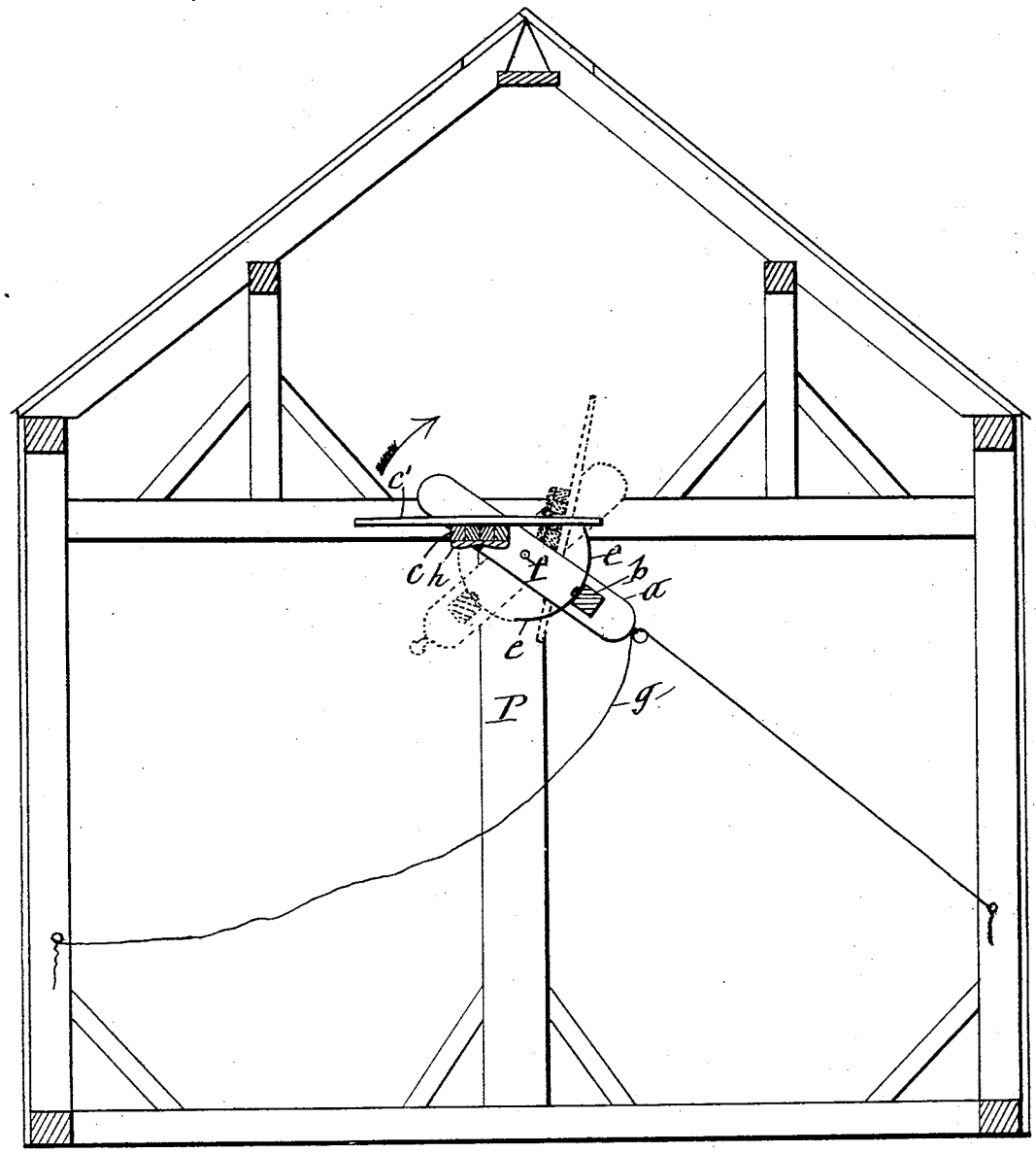

(No Model.) 3 Sheets—Sheet 1.
T. J. MOREY.
APPARATUS FOR MOWING HAY.

No. 573,679. Patented Dec. 22, 1896.

WITNESSES:
M. A. Leyden
H. B. Smith

INVENTOR
Thomas J. Morey
By E. Laass
his ATTORNEY (No Model.) 3 Sheets—Sheet 2.
T. J. MOREY.
APPARATUS FOR MOWING HAY.
No. 573,679. Patented Dec. 22, 1896.
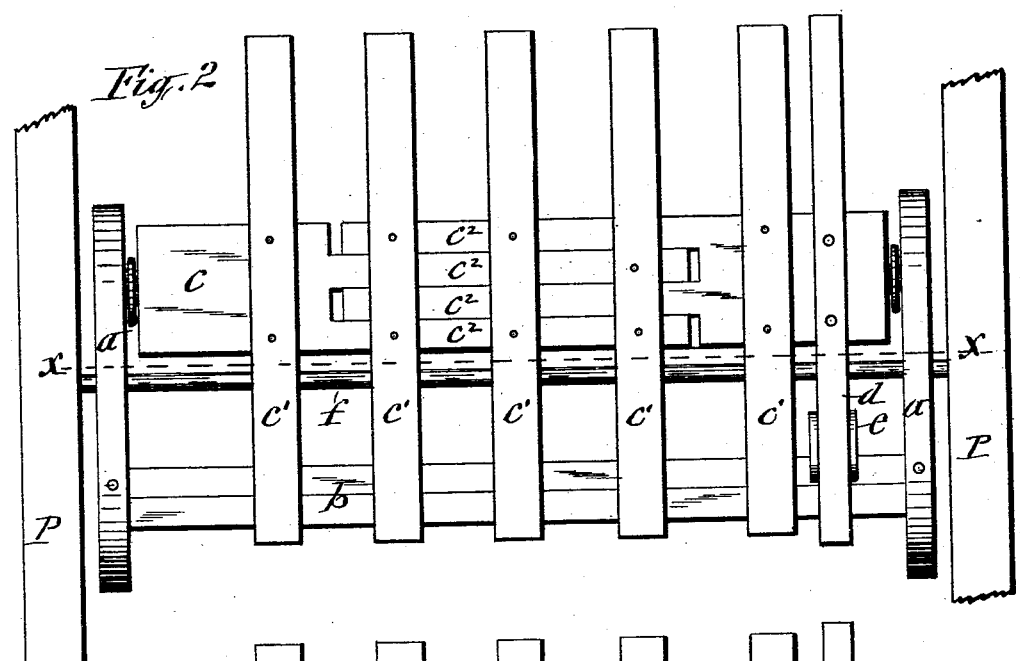
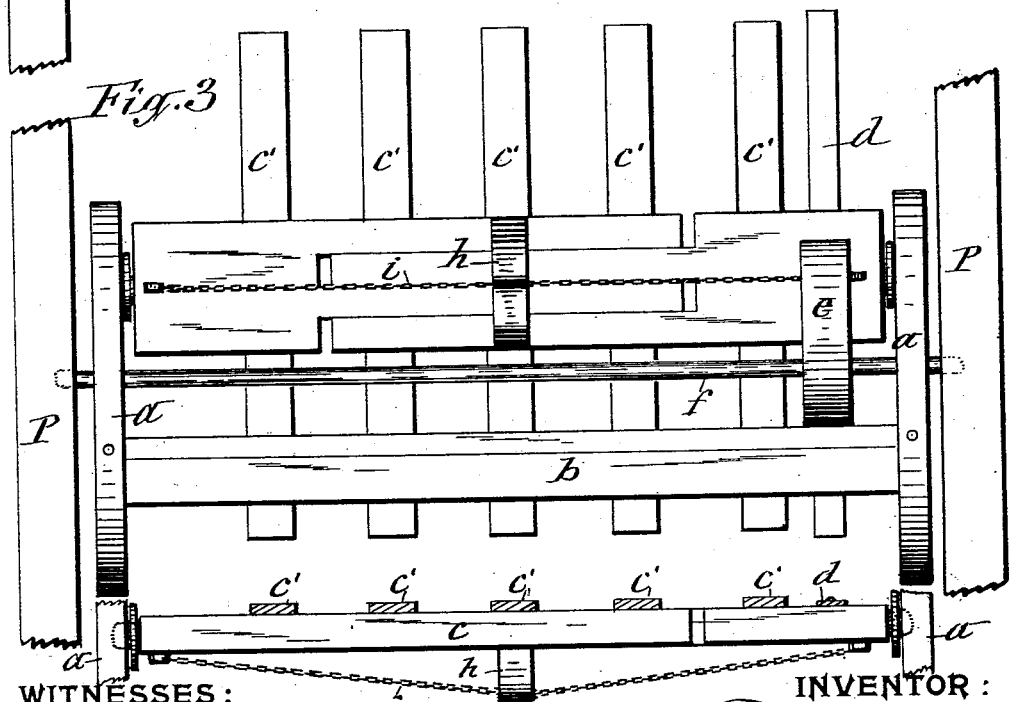
WITNESSES: INVENTOR:
Thomas J. Morey
By E. Laass
his ATTORNEY

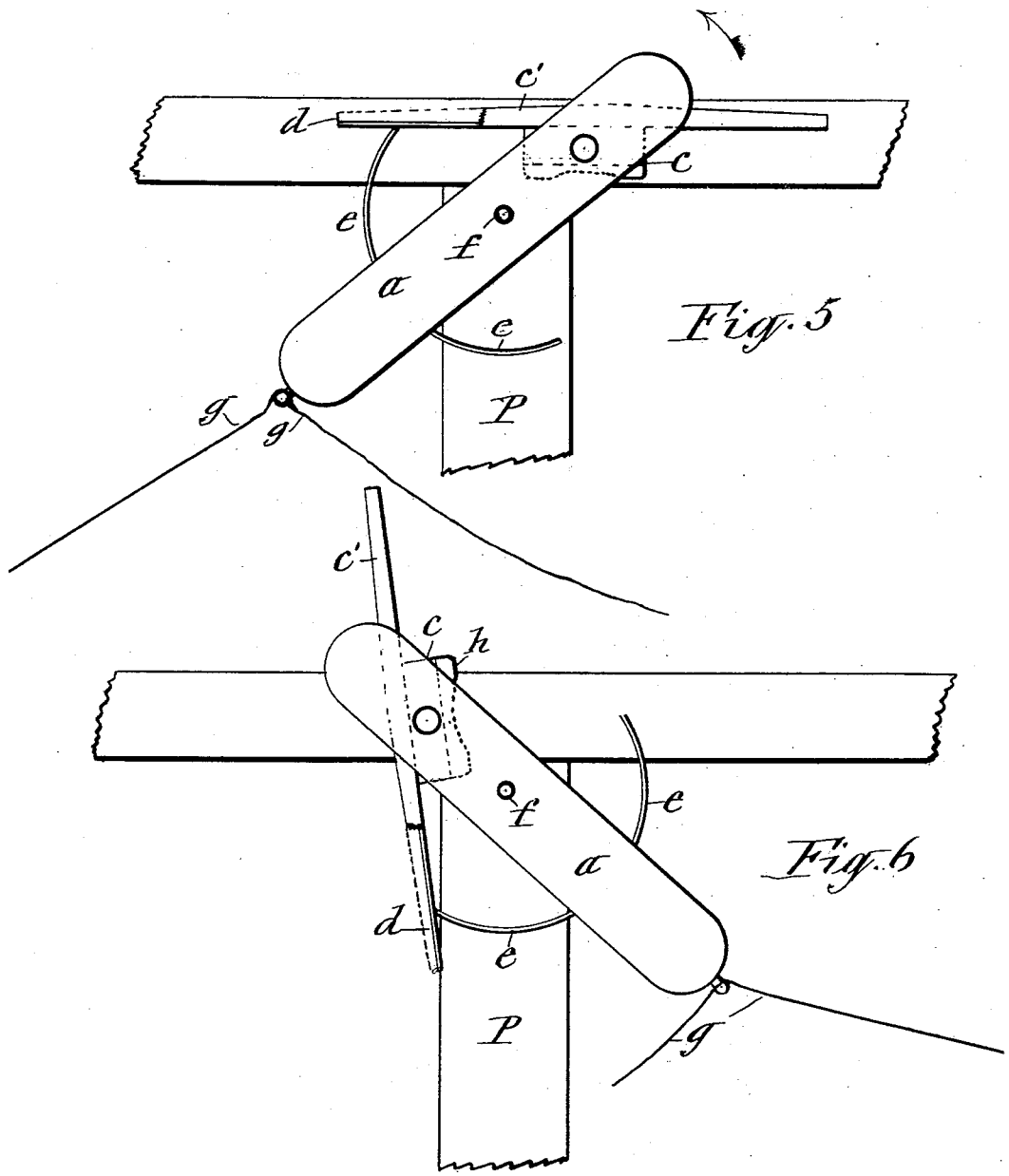

UNITED STATES PATENT OFFICE.

THOMAS J. MOREY, OF NELSON, NEW YORK.

APPARATUS FOR MOWING HAY.

SPECIFICATION forming part of Letters Patent No. 573,679, dated December 22, 1896.

Application filed August 7, 1896. Serial No. 602,019. (No model.)

*To all whom it may concern:*

Be it known that I, THOMAS J. MOREY, of Nelson, in the county of Madison, in the State of New York, have invented new and useful Improvements in Apparatus for Mowing Hay, &c., of which the following, taken in connection with the accompanying drawings, is a full, clear, and exact description.

The object of this invention is to provide simple, convenient, and efficient means for casting hay or grain in bundles into the mow of a barn; and to that end the invention consists, essentially, of a frame pivoted to a horizontal axis, a rack pivoted to said frame parallel and eccentric in relation to the axis of the frame, braces on said frame for sustaining the rack in horizontal position, and means for tilting the frame and rack, as hereinafter more fully described, and set forth in the claims.

In the annexed drawings, Figure 1 is a vertical section of a barn equipped with my mowing apparatus. Fig. 2 is an enlarged plan view of the mowing apparatus. Fig. 3 is a rear side view of the same shown in its tilted position. Fig. 4 is a longitudinal section on line X X in Fig. 2. Fig. 5 is an enlarged end view showing the mowing-rack in position for receiving hay or analogous substance, and Fig. 6 shows the same in its tilted position for casting the hay or other material into the mow.

Similar letters of reference indicate corresponding parts.

$f$ represents a horizontal shaft, which is secured at opposite ends to posts P P or other suitable elevated supports. On this shaft, near the ends thereof, are pivoted at the center of their lengths two arms $a\ a$, which are united at one of their end portions by a bar $b$. At the opposite side of the shaft $f$ is a rack-beam $c$, pivoted to the free end portions of the arms $a\ a$. Across said rack-beam lie the slats $c'$, which are firmly secured at the central portions of their lengths on said rack-beam so as to extend with their end portions from opposite sides of said beam. Parallel with these slats is a spring-plate $d$, also firmly secured to the rack-beam and extending from opposite sides thereof.

To the bar $b$ are fastened two braces $e\ e$, placed in position to cause one of them at a time to bear with its free end on the under side of one of the end portions of the spring-plate $d$ and thereby support the rack in a horizontal position for receiving the hay to be subsequently cast into the mow by the tilting of the rack on its pivot. Said tilting is effected by rocking the supporting-frame of said rack, which frame consists of the arms $a\ a$ and the bar $b$, uniting said arms, as hereinbefore described. For rocking said supporting-frame I attach to the lower end of one of the arms $a\ a$ two ropes $g\ g$, extending in opposite directions therefrom. By drawing tight the rope which extends from the arm in a direction approximately in line with the inclination of said arm and then fastening said rope one of the braces $e$ is made to support the rack in its horizontal position, as shown by full lines in Fig. 1 of the drawings.

To tilt the rack, the aforesaid rope is to be loosened and the other rope $g$ is to be drawn tight with a quick motion, so as to tilt the supporting-frame of the rack in the opposite direction and at the same time impart an upward thrust to the rack, which is pivoted to its supporting-frame at a point eccentric to the shaft $f$ or axis of said supporting-frame, and this thrust, combined with the tilting of the rack, casts the hay or other material into the mow, the direction of the motion being indicated by an arrow in Figs. 1 and 5 of the drawings.

The tilting of the rack is arrested by one of the braces $e$ coming in contact with the corresponding end of the spring-plate $d$, as more clearly shown in Figs. 5 and 6 of the drawings. The contact of the spring-plate with the brace relieves the rack from undue strain or concussion and causes the rack to recoil sufficiently to start the rack to return to its original horizontal position, which it is caused to resume by turning the supporting-frame of the rack by means of the ropes $g\ g$, as hereinbefore described.

In order to render the described apparatus adjustable to different widths of the space it is to occupy in the barn, I make the rack-beam $c$ extensible and contractible in length by forming it of two end sections, from which extend overlapping central portions $c^2\ c^2$, and tie the said portions of the beam together by fastening the slats $c'$ to different central portions of the rack, as shown in Fig. 2 of the drawings, and I brace the said rack-beam by placing on the under side of the center thereof a block *h* and fasten to the opposite ends of the beam a truss chain or rod *i*, which is stretched across the said block, so as to firmly bear against the under side thereof, as represented in Fig. 4 of the drawings, thus forming a truss which securely supports the rack.

What I claim as my invention is—

1. A mowing apparatus consisting of a frame pivoted on a horizontal axis, a rack pivoted to said frame parallel and eccentric in relation to the axis of the frame, braces on said frame for sustaining the rack in horizontal position, and means for tilting the frame and rack as set forth.

2. A mowing apparatus consisting of a frame composed of two parallel arms pivoted at the center of their lengths on a horizontal shaft and a bar parallel with said shaft uniting said arms, a rack pivoted at opposite ends to the aforesaid arms at corresponding end portions thereof, braces attached to the aforesaid bar and sustaining the rack in horizontal position for receiving the hay, and means for tilting the frame and rack as set forth.

3. A mowing apparatus composed of the arms *a a* pivoted at the centers of their lengths on a horizontal axis, the bar *b* uniting said arms at corresponding ends, the rack-beam *c* pivoted at opposite ends to the free ends of the aforesaid arms and having the slats *c′ c′* projecting from opposite sides of the beam, the spring-plate *d* attached at the center of its length to the aforesaid beam, the braces *e* attached to the bar *b* and in position to bear with one end at a time on one of the end portions of the spring-plate, and means for tilting the aforesaid arms as set forth.

4. A mowing apparatus pivoted to and supported on a horizontal shaft and adjustable in length to accommodate the said rack to the width of the space it is to occupy, means for supporting the rack in a horizontal position, and means for tilting said rack to cast the hay &c. to the mow, as set forth.

5. A mowing apparatus composed of the horizontal shaft *f*, secured at opposite ends to fixed elevated supports, the arms *a a* pivoted midway their lengths on said shaft, the bar *b* uniting said arms at one side of the shaft, the rack-beam *c* pivoted to said arms at the opposite side of the shaft, the slats *c′ c′* secured at their central portions to said beam, the spring-plate *d* attached to the rack-beam and extending from opposite sides thereof, the braces *e* attached to the bar *b* and the ropes *g g* attached to one end of one of the aforesaid arms, as set forth and shown.

6. The rack-beam *c* composed of end sections and overlapping central portions $c^2 c^2$, the slats *c′ c′* fastened to said portions of the beam and tying the same together, the cross-block *h* on the under side of the center of the said beam, and the truss chain or rod *i* secured to the end portions of the rack-beam and bearing on the under side of the aforesaid block, all constructed and combined as described and shown.

In testimony whereof I have hereunto signed my name this 20th day of July, 1896.

THOMAS J. MOREY. [L. S.]

Witnesses:
WELLINGTON R. RICHARDS,
LOREN C. BARNES.